United States Patent [19]
Rao

[11] Patent Number: 5,298,350
[45] Date of Patent: Mar. 29, 1994

[54] CALCIUM-TIN-SILVER LEAD-BASED ALLOYS, AND BATTERY GRIDS AND LEAD-ACID BATTERIES MADE USING SUCH ALLOYS

[75] Inventor: Purushothama Rao, Eagan, Minn.

[73] Assignee: GNB Incorporated, Mendota Heights, Minn.

[21] Appl. No.: 852,803

[22] Filed: Mar. 17, 1992

Related U.S. Application Data

[63] Continuation-in-part of Ser. No. 675,298, Mar. 26, 1991, abandoned.

[51] Int. Cl.$^5$ ............................................. H01M 4/68
[52] U.S. Cl. ................................. 429/245; 429/226; 429/233
[58] Field of Search ........................ 429/226, 245, 233

[56] References Cited

U.S. PATENT DOCUMENTS 3,287,165  11/1966  Jensen .................................. 429/226
4,125,690  11/1978  Bagshaw et al. ..................... 429/226

FOREIGN PATENT DOCUMENTS 2758940  12/1977  Fed. Rep. of Germany .
57-74973  11/1982  Japan .................................. 429/226
220561   5/1985  Japan .................................. 429/226

Primary Examiner—Prince Willis, Jr.
Assistant Examiner—M. Nuzzolillo
Attorney, Agent, or Firm—Leydig, Voit & Mayer

[57] ABSTRACT

Automotive SLI lead-acid batteries are disclosed which are characterized by enhanced resistance to positive grid corrosion, even when exposed to the current, relatively high under-the-hood service temperatures in use with recent model automobiles. The grids are formed from either a cast lead-based alloy including from about 0.025 to 0.06% calcium, from about 0.3 to 0.7% tin and from about 0.015 to 0.045% silver, the percentages being based upon the weight of the alloy prior to casting or a wrought lead-based alloy including from about 0.02 to 0.05% calcium, from about 0.3 to 0.5% tin and 0.02 to 0.045% silver, the percentages being based upon the weight of the alloy. Aluminum in an amount of from about 0.008 to about 0.012%, based upon the as-added total weight of the alloy may be used to maintain the desired calcium content during casting.

16 Claims, 2 Drawing Sheets

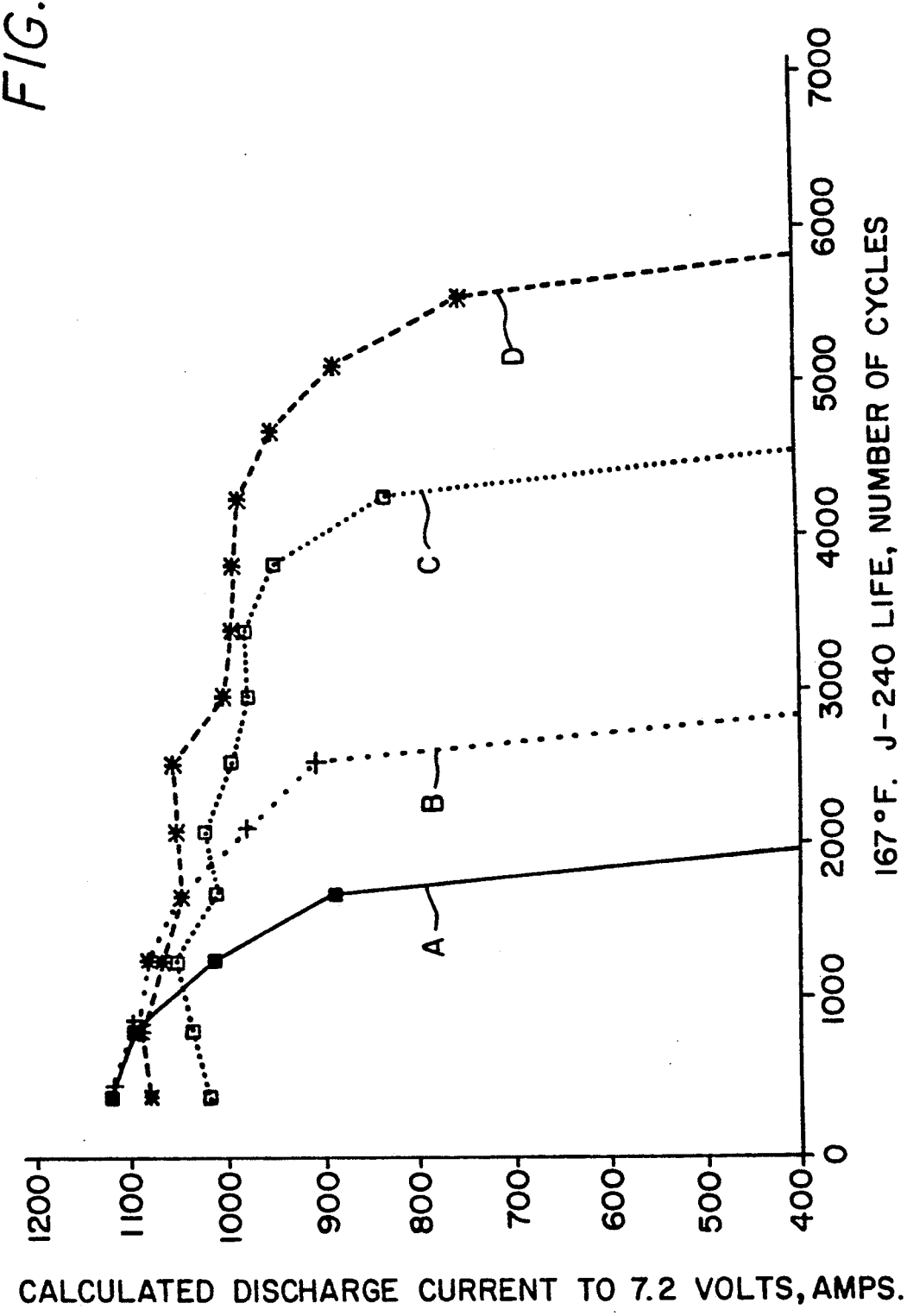

CALCIUM-TIN-SILVER LEAD-BASED ALLOYS, AND BATTERY GRIDS AND LEAD-ACID BATTERIES MADE USING SUCH ALLOYS

This application is a continuation in part of Ser. No. 07/675,298, filed on Mar. 26, 1991, now abandoned.

This invention relates to lead-acid batteries and, more particularly, to alloys for use in making grids in such batteries.

BACKGROUND OF THE INVENTION

Over the last 15 to 20 years or so, there has been substantial interest in automotive-type, lead-acid batteries which require, once in service, little, or more desirably, no further maintenance throughout the expected life of the battery. This type of battery is sometimes termed a "low maintenance" or "maintenance-free battery". The terminology maintenance-free battery will be used herein to include low maintenance batteries as well. This type of battery was first commercially introduced in about 1972 and is currently in Widespread use.

A considerable amount of attention over the years has been addressed to the type of alloys used for positive and negative grids in such maintenance-free batteries. When maintenance-free batteries were first commercially introduced, the conventional automotive lead-acid battery commonly used grids made from antimony-lead alloys in which the antimony content ranged from about 3–4.5% by weight of the alloy composition. Such alloys were capable of being formed at acceptable commercial rates into battery grids by the gravity casting techniques then widely used. Moreover, the batteries made using grids of those alloy compositions had desirable deep discharge cycling characteristics.

Unfortunately, such high antimony content lead-based alloys could not be used for maintenance-free batteries. Thus, the use of such high antimony alloys resulted in the batteries having undesirably high gassing and attendant water loss characteristics. In other words, batteries with grids made from such alloys accepted high end of charge current during constant voltage overcharge so that excessive gas generation occurred. Accompanying this gas generation was loss of water from the electrolyte.

The assignee of the present invention and its predecessors in interest have been in the forefront of research relating to alloys and maintenance-free batteries. Among the patents relating to this subject are the following U.S. Pat. Nos.: 4,006,035; 4,007,056; 4,166,155 and 4,456,579.

Much commercial interest has centered around the use of calcium-tin-lead alloys for use in making grids for maintenance-free batteries. The calcium content in such alloys for positive grids has varied generally from about 0.06 to about 0.1% by weight of the alloy while the tin has generally ranged from about 0.1 up to 0.8% and even more. More typically, the calcium content in such alloys when used for making maintenance-free battery grids has been at least about 0.08% by weight or more.

Other commercial interest for maintenance-free battery grids has been directed to the use of "low antimony" lead-based alloys, viz.—alloys containing antimony contents of about 1 to about 2%, more typically about 1.5% or so. Employing such low antimony alloys generally required efforts to employ other alloying ingredients since such low antimony alloys were not capable of being made into grids at acceptable commercial rates.

Other approaches for grid alloys in maintenance-free batteries have included the use of "hybrid" alloy systems. Most typically, a low antimony, lead-based alloy is used as the alloy for the positive grids while an antimony-free alloy is employed for the negative grids. Often, the alloy of choice for the negative grids has been a calcium-tin-lead alloy or a calcium-aluminum lead alloy.

It has been well recognized over the years that lead-acid batteries are perishable products. Eventually, such batteries will fail through one or more of several failure modes. Among these failure modes are failure due to positive grid corrosion and excessive water loss. The thrust of maintenance-free batteries has been to provide a battery that would forestall the failure during service for a period of time considered commensurate with the expected service life of the battery, e.g.—three to five years or so.

To achieve this objective, the positive grids initially used for maintenance-free batteries typically had thicknesses of about 60 to about 70 mils or so. The batteries were likewise configured to provide an excess of the electrolyte over that needed to provide the rated capacity of the battery. In that fashion, by filling the electrolyte to a level above that of the top of the battery plates, maintenance-free batteries contained, in effect, a reservoir of electrolyte available to replenish the water loss, during the service life of the battery. In other words, while the use of appropriate grid alloys will reduce water loss during the service life of the battery, there will always be some water loss in service. Having an excess of electrolyte will compensate for this loss.

Over the past several years, the manufacture of such automotive lead-acid batteries, typically termed SLI automotive batteries (principally used for the starting, lighting and ignition requirements of an automobile), has gotten substantially more complex. In addition to forming battery grids by gravity casting (e.g.—the hot metal is fed into what is termed a book mold and is then allowed to solidify, the book mold providing two side-by-side grids), equipment is now commercially available by which battery grids can be continuously cast on a rotary drum grid caster. Additionally, battery grids also can be continuously formed by expanded metal techniques. For example, a rolled or wrought alloy strip or a cast strip is slit and expanded using reciprocating dies or the like and then cut into the desired width and height dimensions to form the grid with a lug.

Automobile manufacturers thus have available a variety of techniques for forming battery grids. However, the effect on performance of the batteries when such techniques are used is not understood all that well. This lack of understanding is particularly evident in view of the factors complicating current SLI battery performance requirements.

One complicating factor in attempting to provide satisfactory service life is the seemingly ever-increasing power and energy requirements demanded in current SLI automotive batteries used in modern automobiles. Many factors have contributed to the need and/or desire for such higher power and energy for such batteries. One major indication of power currently in common usage is the rated number of cold cranking amps. The number of cold cranking amps is considered in the industry as some indication of the relative power of the battery to start an automobile in cold temperature conditions.

Yet another complicating factor is the "under-the-hood" space requirements. Automobile manufacturers have significantly lessened the space available for batteries in the engine compartment. Typically, this has required that battery manufacturers provide a lower profile battery, viz.—a battery having less overall height than previously required so as to meet current aerodynamic styling needs in automobiles.

These complicating factors (i.e., a need for increased power and energy with less available space for the battery) have required battery manufacturers to alter the internal configurations to provide the needed power in a lower profile battery container. These internal alterations have typically involved increasing the number of plates used in each cell by employing battery grids with reduced thickness. For example, the number of plates in a BCI Group 24 battery has increased from about 13 to about 19 or so over the last few years while the thickness of the positive grids has decreased from about 70 to 75 mils or so down to about 45 mils and even less in some cases. The reduction in the thickness of the positive grids together with an increase in the number of plates has allowed battery manufacturers to provide Group 24 batteries having rated capacities of 875 cold cranking amps or so. Battery manufacturers currently offer batteries in other BCI sizes having rated capacities up to 1000 cold cranking amps and even more.

What has occurred in recent years is also a substantial increase in the under-the-hood temperature to which the battery is exposed in automobile service. Obviously, the under-the-hood temperature is particularly high in the warmer climates. One automobile manufacturer has perceived that, in the past three years or so, the temperature to which an SLI battery is exposed in such warmer climates has risen from about 125° F. to about 165° F. in new automobiles.

The specific temperature increase which is involved is not particularly important. What is important is that such under-the-hood temperatures have in fact increased. The impact of this increase in the under-the-hood vehicle service temperatures on the failure modes has been to substantially increase the occurrence of premature battery failures. The incidence of premature battery failures due to excessive positive grid corrosion has been significant.

One attempt to deal with the acute problem of relatively high under-the-hood temperatures by one battery manufacturer has been to provide a battery designed for such high temperature conditions. This recently introduced battery goes back to the use of thicker positive grids (about 70 mils or more) while using a smaller number of plates (back down to about 10 per cell). In addition, the head space in each cell is filled with hollow plastic microspheres. The use of such microspheres is perhaps to serve as a vapor barrier to electrolyte for minimizing evaporative loss of water in the electrolyte or perhaps for limiting heat transfer or the like.

What has not been appreciated in the art is the effect of all of these complicating factors and increased under-the-hood temperature on the requirements for the battery grid alloy. The overall battery requirements have drastically increased the need for a positive grid alloy that will impart, in the resulting battery, enhanced resistance to positive grid corrosion.

As is apparent from the foregoing, a considerable amount of prior work in this field has been directed to calcium-tin-lead alloys for use in battery grids. For example, U.S. Pat. No. 4,125,690 to Bagshaw et al. notes that, at calcium contents below 0.075%, the material is insufficiently hard within acceptable periods of time after grid casting and that the corrosion of the alloy is greater as the tin content increases above 1%. Bagshaw et al. found that greatly improved results were obtained with alloys having a selected composition of calcium, tin and aluminum. The calcium content range disclosed for such alloys is from 0.075 to 0.13% by weight.

U.S. Pat. No. 2,860,969 to Walsh is directed to the inclusion of cerium as a grain refiner for lead-calcium, lead-tin-calcium and lead-tin-silver-calcium alloys, which alloys can also contain a small amount of aluminum.

The calcium contents disclosed range from 0.03 to 0.1% with the silver levels exemplified being from 0.1 to 0.5% by weight.

Additionally, and more recently, silver calcium-tin-lead positive grid alloys have been employed in sealed, oxygen gas recombinant lead-acid batteries. Such alloys also contain aluminum in an amount of about 0.02 to 0.03% by weight. The calcium content ranges from about 0.09 to about 0.11% by weight while the silver content ranges from about 0.016–0.02% by weight, and the tin content ranges from about 0.5–0.75% by weight.

In spite of all the considerable work directed to maintenance-free batteries over the past several years, the complicating factors and other aspects previously discussed have created a substantial need for maintenance-free batteries that can meet the power and energy demands required and yet have an adequate service life, particularly when used in warmer climates under current under-the-hood vehicle temperature conditions. The entire environment and requirements for the battery present an extremely complicated situation which is not all that well understood.

It is accordingly an object of the present invention to provide a maintenance-free, lead-acid battery capable of satisfactory service life when exposed to relatively high temperature environments.

Another, and more specific, object lies in the provision of an alloy composition useful for making positive grids for such maintenance-free batteries.

A still further object of this invention is to provide an alloy that can be made into positive grids for such maintenance-free batteries using any one of the commercially satisfactory manufacturing methods.

Yet another object provides a positive grid alloy for such maintenance-free batteries that will impart enhanced resistance to positive grid corrosion relative to batteries using positive grids made from alloys presently being used.

An additional object of the present invention is to provide an alloy for a positive grid that may be readily formed into a positive grid without undue loss of an of the alloying ingredients.

Other objects and advantages of the present invention will be apparent as the following description proceeds, taken in conjunction with the accompanying drawings.

SUMMARY OF THE INVENTION

In general, the present invention is predicated on the discovery that the current positive grid alloys being used for maintenance-free, SLI automotive batteries will not reliably provide an adequate service life when used in the warmer climates. It has been found that a lead-based grid alloy, having an, as added, composition by weight of the total alloy of calcium in the range of from about 0.025–0.06%, tin in the range of from about 0.3 to about 0.045%, will provide positive grids that will impart to a maintenance-free battery a useful service life in current automobiles operating with high under-the-hood temperatures even in geographical regions with relatively high ambient conditions.

When positive grids are made by gravity casting, it has been found that calcium losses occur. Accordingly, one aspect of this invention comprises utilizing, in the alloy composition previously described, aluminum added in an amount to maintain the desired calcium content in the cast positive grid. Adding aluminum to the starting alloy in an amount of from about 0.008 to about 0.0120%, based upon the as-added total weight of the alloy, has been found suitable for this purpose.

While the invention is susceptible of various modifications and alternative forms, specific embodiments thereof will hereinafter be described in detail. It should be understood, however, that it is not intended to limit the invention to the particular form disclosed, but, on the contrary, the intention is to cover all modifications, equivalents and alternatives falling within the spirit and scope of the invention as expressed in the appended claims.

BRIEF DESCRIPTION OF THE DRAWINGS

FIG. 3 is a graph comparing the high temperature performance of the batteries of the present invention with that of conventional batteries.

DETAILED DESCRIPTION OF THE INVENTION

Figure 1:
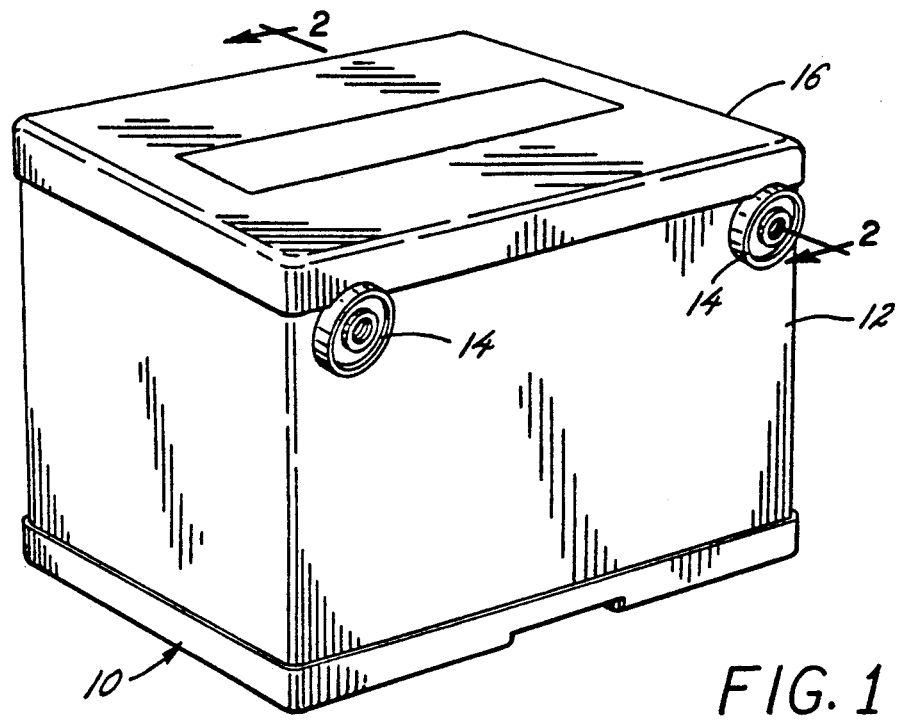
FIG. 1 is a perspective view of a maintenance-free battery of the present invention.

Pursuant to the present invention, the alloys employed in positive grids contain calcium in a range of from about 0.025 to about 0.06%, preferably in the range of 0.025 to 0.05%. More particularly, due to losses during gravity casting, the actual calcium content in the resulting cast alloy grid will be somewhat less than the as added composition previously noted, e.g.—the calcium content in a cast grid may be about 0.015% or so when the added calcium level was 0.025%. It is preferred to maintain the range of the calcium, as added, from about 0.035 to 0.055%, so that the cast grid alloy contains 0.025 to 0.05% by weight.

One interesting aspect about the alloys of the present invention is that photomicrographs of the cast alloys are considered to indicate no real difference in the microstructures as compared to the microstructures resulting from using high calcium content calcium-tin-lead alloys. It might accordingly be expected that batteries utilizing the alloys of the present invention to form the positive grids would have positive grid corrosion characteristics similar to those of batteries utilizing positive grids formed from the conventional high calcium alloys.

However, that has been found not to be the case. Batteries utilizing the alloys of the present invention to form the positive battery grids exhibit substantially improved positive grid corrosion resistance characteristics. Such improved characteristics translate to a significantly longer useful battery service life.

The tin content of the alloys of the present invention can range from about 0.3 to about 0.7% or so, preferably from 0.3 to 0.6%, more preferably from 0.4 to 0.6%. In general, the tin content employed will be about 10 times that of the calcium.

The silver content of the alloys of this invention ranges from about 0.015 to 0.045% based upon the total weight of the alloy composition. It is preferred to maintain the silver content in the range of 0.025 to 0.045%, and, more preferably, from 0.03 to 0.045%. Further, in some applications, the silver content may be somewhat higher, up to about 0.055% or 0.06%.

The alloys of the present invention may be produced in the conventional manner by adding the alloying constituents in the prescribed amounts to the molten lead and then mixing until the mass is homogeneous. Commercially used high speed grid manufacturing techniques, which are well known, can then be used. The casting temperatures generally used range from about 750° F. to about 850° F., and the molten alloy is poured into molds maintained at a temperature of about 350° to 450° F.

The alloys of the present invention can be formed by such conventionally used techniques as gravity cast grids by using conventional book molds at rates comparable to those used with presently used alloys. Additionally, the alloys of the present invention may be continuously cast into positive battery grids utilizing commercially available equipment of this type. Still further, the alloys of the present invention may be made into a cast strip or a wrought strip; and the positive grids then may be made using expanded grid fabrication methods.

Positive battery grids formed using the alloys described herein are characterized by adequate stiffness and age hardening responses so as to provide a grid which has characteristics satisfactory for the subsequent pasting, curing and battery assembly operations which are required.

As previously discussed, the actual calcium content in the resulting cast alloy grid, due to losses during gravity casting, will be somewhat lower than the as-added amount of calcium, e.g.—the calcium content in a cast grid may be about 0.015% or so when the added calcium level was 0.025%. More specifically, it has been found that in grid casting, due to atmospheric oxidation or the like, the calcium content in the cast grid can drop from that of the as-added content anywhere from about 0.005 to 0.015%, and perhaps as much as 0.035% in some instances.

Such low calcium contents in the cast positive grid (e.g.—0.015% or so) are desirable as regards corrosion resistance. However, stiffness of the cast grids typically is greatly reduced as the calcium content in the cast alloy drops below 0.025%. Also, such low calcium content cast grids can cause problems in mass production battery assembly.

Pursuant to one specific aspect of this invention, aluminum is added to the starting alloy composition in an amount sufficient to maintain the desired calcium content in the gravity cast grid. It has thus been found suitable to add aluminum to the starting alloy composition in an amount of from about 0.008 to about 0.0120%, based upon the as-added total weight of the alloy. It is believed that the aluminum serves as an oxygen scavenger and forms a protective layer on the melt surface, thus preventing calcium oxidation. The small level of aluminum added should not adversely affect to any significant extent the highly desirable corrosion resistance characteristics of positive grids cast from the alloy composition of this invention.

While the use of aluminum has been found suitable to maintain the desired calcium content in the cast positive grid, it should be appreciated that any other oxygen scavenger may be used in place of aluminum for this same function. However, any other oxygen scavenger employed, of course, should not adversely affect to any significant extent the highly desirable corrosion resistance characteristics that are achieved utilizing the present invention.

Figure 2:
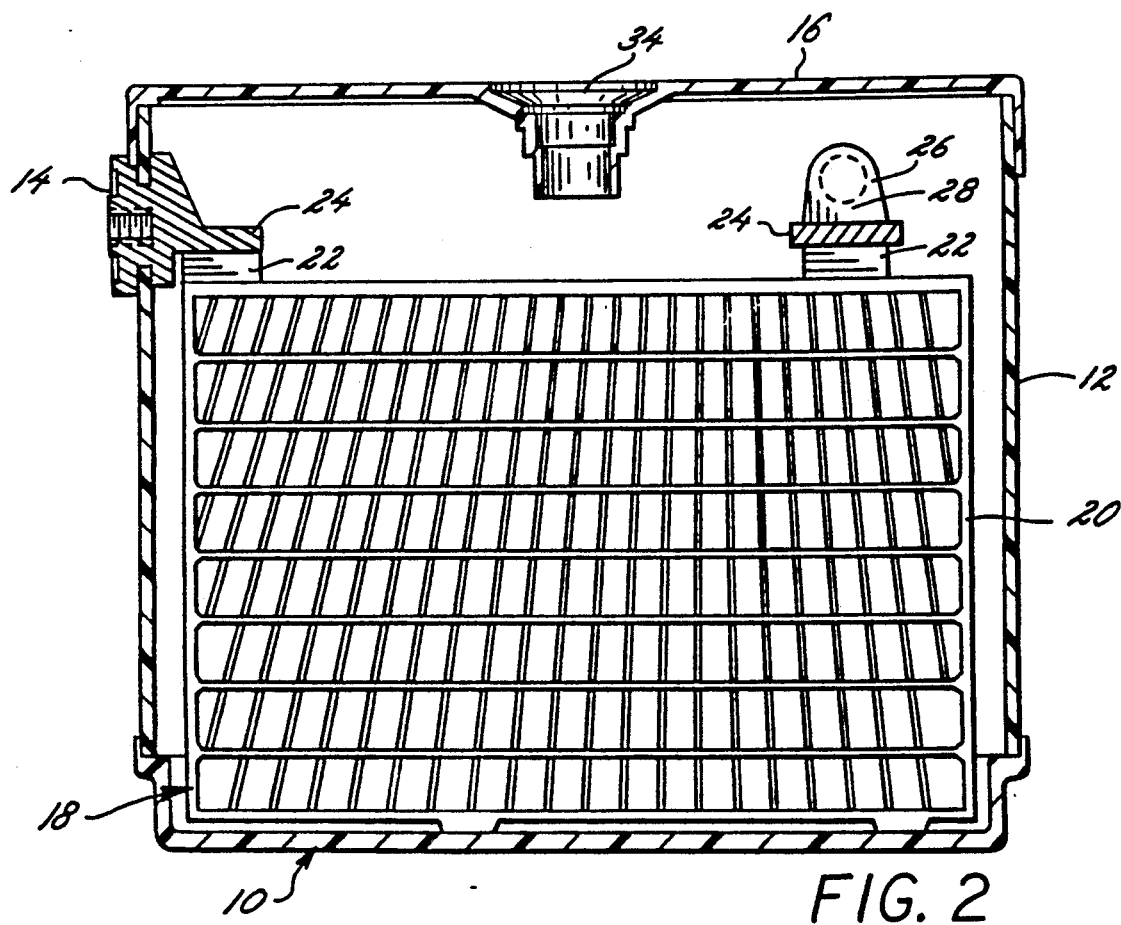
FIG. 2 is a cross-sectional view taken generally along the line 2—2 of FIG. 1 and showing a battery grid made utilizing an alloy composition in accordance with the present invention.

Turning now to the drawings, FIGS. 1 and 2 show a maintenance-free battery utilizing the unique alloy composition of this invention for the positive grids. Thus, a maintenance-free battery 10 is shown which includes a container 12, a pair of side terminal posts 14 and a cover 16 sealed to the container by any conventional means. The container is divided into a plurality of cells, a portion of one cell being shown in FIG. 2; and a battery element is disposed in each of these cells. The battery element comprises a plurality of electrodes, one of the positive grids being shown generally at 18. The negative grids are of identical or similar construction but are formed with any desired antimony-free alloy. The electrode illustrated includes a supporting grid structure 20 having an integral lug 22 and a layer of active material pasted thereto; and a strap 24 joining the lugs 22 of the respective positive and negative grids together.

Intercell connectors are shown generally at 26 and include a "tombstone" 28 which forms a part of the strap 24. The strap 24 may be fused to the grid lugs 22 in assembling the components into an element as is known. The terminals 14 are similarly electrically connected through separate straps 24 to the supporting grid structure 20 during assembly, the base of the terminal forming a part of the strap 24. Suitable venting systems for allowing evolved gases to escape are shown at 34. Many satisfactory venting systems are well known.

The particular design configurations of the battery may be varied as desired for the intended application. The alloys described herein, and positive grids made using such alloys, may be advantageously utilized in any type and size of lead-acid automotive battery. For example, the alloys of the present invention and battery grids made therefrom may be advantageously used in dual terminal batteries such as those shown in U.S. Pat. No. 4,645,725. Similarly, while a battery having side terminals has been exemplified, the battery of this invention could comprise a top terminal battery.

The thickness of the positive grids can vary as is desired for a particular service life and a particular desired rated capacity. However, with any given thickness positive grid, the batteries utilizing the alloys of the present invention will impart enhanced positive grid corrosion resistance to the battery in comparison to conventional maintenance-free batteries having positive grids formed from previously used alloys. In general, the grid thickness in the batteries of this invention can desirably vary from about 45 to about 75 mils for most applications. These grid thicknesses should be considered merely exemplary.

As previously noted, the alloys used for the negative grids can be varied as desired. Thus, for maintenance-free battery performance, any negative grid alloy can be used that will provide such performance. This will generally involve an antimony-free, lead-based alloy. Among the typical alloys used for forming negative grids include calcium-tin-lead alloys or calcium-aluminum alloys having the following composition: calcium 0.09 to 0.16%, tin 0.15 to 0.55%, and the balance lead or calcium 0.09 to 0.16%, aluminum 0.01 to 0.035% and the balance, lead.

The alloy for the strap, including the intercell weld connection, can be any strap alloy that will provide the desired characteristics. Many such alloys are known and have been used. However, to provide desirable service life for the current under-the-hood conditions in the warmer climates, it is preferred to utilize the antimony-arsenic-tin-selenium lead-based alloys described in the copending Rao et al application.

While it is preferred to utilize cast positive grids, it should be appreciated that the positive grids may likewise be formed by continuous expanded metal techniques from rolled, cast or wrought strips. Such techniques are well known.

However, making a positive grid by expanded metal techniques will alter the desired alloy composition somewhat. To this end, when expanded metal techniques are used to form the positive grid, the alloy used, in accordance with this invention, will have the following composition: calcium in the range of from about 0.02 to about 0.05% by weight, tin in the range of from about 0.3 to about 0.5% and silver in the range from about 0.02 to 0.045%. The alloy composition set forth is that of the grid. However, in general, and in contrast to gravity casting techniques, the composition of the grid has not been found to differ in any significant respect from that of the alloy composition used to make the rolled, cast, or wrought strip from which the grid is made. In other words, the composition of the as-added alloy composition does not differ from that of the grid itself.

The following Example is illustrative, but not in limitation, of the present invention. Unless otherwise indicated, the percentages set forth are based upon the total weight of the alloy, as added.

EXAMPLE

This Example compares the life test performance of batteries made with positive grids according to the present invention with batteries having positive grids of high calcium content alloys.

A series of BCI Group 26/70 batteries were built in a dual terminal configuration, as disclosed in U.S. Pat. No. 4,645,725. Batteries with this configuration are commercially available. Two positive grid designs were used, and the details are set forth in Table 1:

TABLE 1

|  | 73J | 56TS |
|---|---|---|
| Positive grid weight - gms | 66 | 50 |
| Positive grid thickness - inches | 0.073 | 0.056 |
| Positive grid dimensions (H × W) in | 3.93 × 5.64 | 4.25 × 5.64 |
| Positive grid area - in$^2$ | 22.1 | 24.0 |
| Horizontal internal wire cross section - in$^2$ | 0.0025 | 0.0017 |
| Vertical internal wire cross section - in$^2$ | 0.0018–0.0022 | 0.0013–0.0016 |
| Horizontal/vertical internal wire corrosion diameter - in | 0.057/0.050 | 0.050/0.040 |

Positive grids were cast from three different alloys using conventional gravity casting methods. The cast grids had the following compositions: Alloy 1 (0.029% calcium, 0.49% tin, 0.032% silver and the remainder lead), Alloy 2 (0.045% calcium, 0.48% tin, 0.031 silver and the remainder lead), and Commercial grid alloy (0.1% calcium, 0.62% tin and the remainder lead).

Batteries using both positive grid designs and the three alloys were built with the same plate count per cell (i.e.—6 positive and 6 negatives). Other than the difference in the positive grid alloy used, all of the batteries built with each of the two grid designs were identical.

The batteries built with the thicker grid design (i.e.—the 73J grid) used the constructional parameters set forth in Table 2:

TABLE 2

| | |
|---|---|
| Number of plates per cell | 12 (6 positive, 6 negative) |
| Positive plate enveloped with 0.027 inch thick Daramic separator | |
| Positive grid weight | 66.0 grams |
| Postive paste weight - unformed | 83.1 grams |
| Negative grid weight | 32.5 grams |
| Alloy composition of the expanded metal negative grids | 0.065% calcium, 0.5% tin, balance-lead |
| Negative paste weight - unformed | 67.9 grams |

The batteries built with the thinner grid design (i.e.—the 56TS design) used the constructional parameters set forth in Table 3:

TABLE 3

| | |
|---|---|
| Number of plates per cell | 12 (6 positive, 6 negative) |
| Positive plate enveloped with 0.033 inch thick Daramic separator | |
| Positive grid weight | 49 grams |
| Positive past weight - unformed | 81.3 grams |
| Negative grid weight | 32.5 grams |
| Alloy composition of the expanded-metal negative grids | 0.065% calcium, 0.5% tin, balance lead |
| Negative paste weight - unformed | 67.9 grams |

After completing the usual BCI initial performance testing (i.e.—alternating Reserve Capacity and Cold Cranking Amps), the various batteries built were tested using the industry-accepted SAE J240 life test. The temperatures used were 105° F. (the current temperature specified in the SAE J240 test) and 167° F. The principal failure mode at 167° F is positive grid corrosion, and testing at this temperature is considered to be a more realistic test of the efficacy of a positive grid alloy as regards corrosion resistance, than is testing at 105° F. in view of the under-the-hood temperature conditions now being experienced in automobiles.

The results of the testing (based upon at least two batteries in each combination) are set forth in Table 4:

TABLE 4

| | 73J Positive Grids | | 56S Positive Grids | |
|---|---|---|---|---|
| Grid Alloy | 105° F. | 167° F. | 105° F. | 167° F. |
| Alloy 1 | 7740–9030 | 3300–4950 | 6600 | 2400–4500 |

TABLE 4-continued

| | 73J Positive Grids | | 56S Positive Grids | |
|---|---|---|---|---|
| Grid Alloy | 105° F. | 167° F. | 105° F. | 167° F. |
| Alloy 2 | 8200–9900 | 3400–4200 | 6500 | 2400–4000 |
| Commercial grid alloy | 9000 | 1500 | 7500 | 1075 |

The variation in high temperature performance using the grid alloys of the present invention is considered to reflect minor problems in the manufacturing of the batteries built for testing (i.e.—start-up problems such as bent plates and the like arising from learning how to handle these grids in comparison to the stiffer conventional grids), rather than reflecting any variation in performance due to the alloys used. Eliminating these minor manufacturing problems will allow achieving the consistently superior cycle life and field service that batteries using the alloys of this invention should enjoy. Regardless of the variation in performance in the battery tested, the batteries made using the positive grid alloys of the present invention provided substantially better high temperature performance than the performance provided by the commercially used positive grid alloy.

Indeed, the excellent high temperature performance results using the positive grid alloys of this invention that are shown in the Example are considered to be indicative of the performance results that may be obtained using the present invention. For example, Table 5 shows results obtained with BCI Group 34/78 batteries built using a commercial positive grid alloy (i.e.—0.10% calcium, 0.66% tin and the remainder lead) in comparison to batteries built using Alloy 3, an alloy according to the present invention (i.e.—the alloy composition of the cast grid was 0.037% calcium, 0.45% tin, 0.032% silver and the balance lead):

TABLE 5

| Positive Grid Alloy | Plates Per Cell | Total Plate Area - in$^2$ | Rating | | Current Density A/in$^2$ At | | J240 Life | | | |
|---|---|---|---|---|---|---|---|---|---|---|
| | | | | | | | 105° F. | | 167° F. | |
| | | | RC* | CCA** | 625 Amps | 875 Amps | 625 Amps | 875 Amps | 625 Amps | 875 Amps |
| Commercial alloy[1] | 19TS[2] | 929 | 125 | 875 | 0.67 | 0.94 | 4300+[3] | 2365 | 2795 | 2365 |
| Alloy 3 | 15J[2] | 620 | 110 | 625 | 1.00 | 1.41 | 3440+[3] | 3655 | 5590+[3] | 4400 |

*Reserve Capacity, mins.
**Cold Cranking Amps
[1] The alloy composition of the grid was 0.10% calcium, 0.66% tin and the balance lead.
[2] The details of these grid designs are as set forth in Table 1.
[3] "+" indicates that the battery tests were still continuing (viz. - after the cycles indicated, the cycling was continuing since the batteries were still passing the test).

The data in Table 5 supports the view that batteries made with positive grids using the alloy of this invention have such superior performance that similar performance can be obtained even when fewer plates per cell are used and the total plate area is substantially less. Satisfactory performance is obtained even when the battery is discharged at a rate substantially in excess of the rating of the battery (viz.—in Table 5, almost twice the J240 cycle life was provided at 167° F. even when discharged at 875 amps, which was well over the 625 cold cranking amps rating of the battery).

Further, the batteries of this invention, using the unique positive grid alloys, will provide improved performance as the service life of the battery continues, even when the initial performance may be slightly less than that of a conventional battery (due to the use in the conventional battery of more and thinner plates per cell and more total plate area). More particularly, batteries according to the present invention experience substantially less degradation in performance over the useful service life of a battery in comparison to the performance degradation experienced by conventional batteries.

This improved performance over the useful service life can be seen from the data plotted in FIG. 3. Curves A and B show the calculated discharge current in amps to 7.2 amps at 167° F. as the conventional Group 34/78 dual terminal batteries described in conjunction with Table 5 (i.e.—using the commercial positive grid alloy) were discharged, respectively, at 875 amps and 625 amps. Curves C and D show the same calculated discharge currents for the Group 34/78 batteries of the present invention also described in conjunction with Table 5, discharged at 875 and 625 amps. A comparison of curves A and C show that the degradation in the discharge current is much less severe for the batteries of the present invention even when discharged at a current (875 amps) well above the rated CCA capacity (625 amps) for the batteries of the present invention. A comparison of curves B and D shows that the batteries of this invention exhibit substantially shallower degradation than is the case with conventional batteries. This substantial improvement in performance by the batteries of this invention will be even more pronounced at lower temperatures.

It has also been found that positive grid corrosion characteristics are influenced by open circuit conditions, including open circuit wet storage at ambient temperature conditions. The rate of positive grid corrosion is about three times faster under open circuit voltage storage conditions than under regulated voltage controlled charging. Also, under typical automobile use, the battery is on open circuit up to about 90% of the time.

Accordingly, the positive grid corrosion characteristics of batteries under open circuit conditions has a significant impact upon performance of a battery. The batteries of the present invention exhibit excellent resistance to positive grid corrosion in comparison to that of conventional batteries under open circuit conditions.

Thus, the batteries of the present invention exhibit excellent resistance to positive grid corrosion in comparison to that of conventional batteries under all important conditions where positive grid corrosion is often the prime failure mode. This excellent resistance to positive grid corrosion equates to better performance of the batteries of this invention as the service life of the battery continues due to the greater degradation experienced by conventional batteries.

Moreover, this better performance of the batteries of this invention allows the battery manufacturer a wide range of design choices, allowing excellent cost-performance batteries that may be designed for the requirements of a particular application. As one dramatic example, the battery of this invention described in conjunction with Table 5 utilizes about two pounds of lead less than the conventional batteries described in relation to Table 5. A superior performing battery is provided, and the reduced material costs translate to savings substantially larger than the profit margin often available to battery manufacturers.

I claim:

1. An automotive SLI battery comprising a battery container having a plurality of cells and an electrolyte contained in the cells, each cell having a plurality of positive and negative electrodes disposed therein comprising a grid supporting structure having a layer of active material pasted thereto, said grid supporting structures for the positive electrodes being a cast structure of a lead-based alloy consisting essentially of lead, from about 0.025 to 0.06% calcium, from about 0.3 to 0.7% tin and from about 0.015 to 0.045% silver, the percentages of calcium, tin and silver being based upon the weight of the alloy prior to casting.

2. The battery of claim 1 wherein the calcium is present in an amount of from about 0.035 to 0.055%.

3. The battery of claim 1 wherein the tin is present in an amount of from about 0.3 to 0.6%.

4. The battery of claim 1 wherein the silver is present in an amount of from about 0.025 to 0.045%.

5. The battery of claim 4 wherein the silver is present in an amount of from about 0.03 to 0.045%.

6. An automotive SLI battery comprising a battery container having a plurality of cells and an electrolyte contained in the cells, each cell having a plurality of positive and negative electrodes disposed therein comprising a grid supporting structure having a layer of active material pasted thereto, said grid supporting structures for the positive electrodes being a wrought, expanded metal mesh grid of a lead-based alloy consisting essentially of lead, from about 0.02 to 0.05% calcium, from about 0.3 to 0.5% tin and from about 0.02 to 0.045% silver, the calcium, tin and silver percentages being based upon the weight of the alloy.

7. The battery of claim 6 wherein the calcium is present in an amount of from about 0.02 to 0.04%.

8. A cast battery grid for supporting an electrochemically active material in an automotive SLI battery, said grid being of a lead-based alloy consisting essentially of lead, from about 0.025 to 0.06% calcium, from about 0.3 to 0.7% tin and 0.015 to 0.045% silver, the percentages of calcium, tin and silver being based upon the weight of the alloy prior to casting.

9. The grid of claim 8 including aluminum in amount of from about 0.008 to about 0.012%, based upon the weight of the alloy prior to casting.

10. The grid of claim 8 wherein the calcium is present in an amount of from about 0.035 to 0.055%.

11. The grid of claim 8 wherein the tin is present in an amount of from about 0.4 to 0.6%.

12. The grid of claim 8 wherein the silver is present in an amount of from about 0.025 to 0.045%.

13. The grid of claim 12 wherein the silver is present in an amount of from about 0.03 to 0.045%.

14. An expanded metal mesh grid for supporting an electrochemically active material in an automotive SLI battery, said grid being of a lead-based alloy consisting essentially of lead, from about 0.02 to 0.05% calcium, from about 0.3 to 0.5% tin and from about 0.02 to 0.045% silver, the percentages being based upon the weight of the grid.

15. The grid of claim 14 wherein the calcium is present in an amount of from about 0.02 to 0.04%.

16. An automotive SLI battery comprising a battery container having a plurality of cells and an electrolyte contained in the cells, each cell having a plurality of positive and negative electrodes disposed therein comprising a grid supporting structure having a layer of active material pasted thereto, said grid supporting structures for the positive electrodes being an expanded metal mesh grid of a lead-based alloy consisting essentially of lead, from about 0.02 to 0.05% calcium, from about 0.3 to 0.5% tin and from about 0.02 to 0.045% silver, the percentages being based upon the weight of the grid.

* * * * *

UNITED STATES PATENT AND TRADEMARK OFFICE
CERTIFICATE OF CORRECTION

PATENT NO. : 5,298,350

DATED : MARCH 29, 1994

INVENTOR(S) : PURUSHOTHAMA RAO

It is certified that error appears in the above-identified patent and that said Letters Patent is hereby corrected as shown below:

Column 1, line 22, delete "W" in "Widespread" and insert -- w --;

Column 4, lines 16-18, starting with "The calcium..." should not start a new paragraph;

Column 4, line 56, delete "an" and substitute therefor -- any --;

Column 5, line 3, after "about" insert -- 0.7% and silver in the range of from about 0.015 to about --;

Column 5, line 46, between "as" and "added" insert "-"; and

Column 11, line 16, start a new paragraph with the words "A comparison...".

Signed and Sealed this

Twenty-fifth Day of April, 1995

Attest:

BRUCE LEHMAN

Attesting Officer    Commissioner of Patents and Trademarks